Patented Apr. 29, 1952

2,594,579

UNITED STATES PATENT OFFICE 2,594,579

POLYSTYRENE INTERPOLYMERS CONVERTIBLE TO THE INFUSIBLE AND INSOLUBLE STATE

Emil E. Novotny, Prospectville, and George Karl Vogelsang, La Mott, Pa., assignors to The Borden Company, New York, N. Y., a corporation of New Jersey No Drawing. Application August 14, 1948, Serial No. 44,402

6 Claims. (Cl. 260—79.7)

1

The present invention relates to polystyrene interpolymers which are convertible to the thermo-rigid or vulcanized rubbery state via the use of appropriate "curing or cross linking" agents. In a more specific sense the present invention relates to polystyrene interpolymers which contain a plurality of functionally reactive atomic groups which are susceptible to reaction with appropriate curing or cross linking agents.

An object of the present invention is to provide polystyrene interpolymers which are convertible to an infusible, thermo-rigid or vulcanized rubbery state via the use of appropriate "curing or cross linking" agents.

Another object of the invention is to provide polystyrene interpolymers which are substantially more heat resistant than the conventional straight polystyrenes.

A further object is to provide polystyrene interpolymers which while originally possessed of the attributes associated with straight polystyrene may be cured and rendered insoluble and highly resistant toward a wide variety of chemical reagents.

A still further object is to provide polystyrene interpolymers which include certain functionally reactive atomic groups which render the interpolymers capable of being converted to the infusible and insoluble state as above set forth.

Yet another object is to provide a novel method for producing polystyrene derivatives capable of being thus converted.

An additional object is to provide a method whereby, by copolymerizing styrene with appropriate substances, and by thereafter appropriately treating the copolymer if necessary, a modified polystyrene is formed which is capable of conversion as above set forth.

These objectives are achieved by interpolymerizing styrene with some other substance which either contains within itself functionally reactive atomic group which is susceptible to reaction with appropriate curing or cross linking agents, so that the interpolymer may thereby become converted to the substantially insoluble, infusible, thermo-rigid or vulcanized rubbery state, or which contains within itself an atomic group which, by virtue of subsequent treatment, may be converted into the functionally reactive atomic group above mentioned. Such convertible groups are hereinafter termed "potentially functionally reactive atomic groups." The term "interpolymer" is used herein as meaning the resultant product of a polymerization in which two separate substances take part (in the present invention, styrene is always one of those substances) and in which the two substances are structurally joined in the final product. By the term "functionally reactive atomic groups" we mean such groups as will react with appropriate curing or cross linking agents to bring about the conversion of the polystyrene interpolymer to an infusible, thermo-rigid or vulcanized rubbery state.

We have found that when functionally reactive atomic groups are present in the interpolymer in sufficient quantity and form a part of the interpolymer by being structurally connected to the substance other than styrene which enters into the interpolymerization, a substance results which has the desired and above-described characteristic. The functionally reactive atomic groups are characterized by containing reactive hydrogen atoms, and are typified by groups such as —OH, —SH, —NH$_2$, —NHCH$_3$, and other groups corresponding to the general formula NHR in which R designates an organic radical.

The herein referred to "curing or cross linking agents" may be of the most diverse nature. Representative of such compounds are those belonging to the class comprising the saturated halogenation addition products of the aldehydes of the mono hetero atomic five membered rings and their reactive derivatives, e. g., methyl furfural or saturated chlorinated products of the aldehydes of furan and its homologs such as saturated chlorinated furfural. These halogenated compounds and methods for their production are described in co-pending application Serial No. 464,524, filed November 4, 1942, now Patent No. 2,490,462. Reactive derivatives of the aforementioned halogenated aldehydes are equally usable, e. g., partially dehalogenated chlorinated furfural, and are in part described in the aforementioned application, but are more fully described in co-pending application Serial No. 466,480, filed November 21, 1942, now Patent No. 2,475,801.

The above referred to "curing or cross linking" agents are mentioned only in the interests of specificness, and it is to be understood that many other compounds known to be possessed of "curing or cross linking attributes" may be utilized including many of the so-called "vulcanizing agents" and numerous "hardening agents" as used in the synthetic resin field.

Although numerous methods have been described in the literature for the production of polystyrenes which are possessed of a high degree of heat resistance and a greater than usual degree of resistance toward chemicals and solvents, the present invention possesses certain distinct advantages over the prior art. First and foremost is the fact that the products of the prior art are merely modified polystyrenes automatically cross linked "in situ" in the process of polymerization, whereas the products of the present invention are per se not so cross linked and as such may be utilized in a wide variety of processes in which the use of already set up or cross linked polymers is precluded. The necessary curing or cross linking agent is added to the products of the present invention at the time of use and then, generally via the application of heat, the curing reaction sets in somewhat after the manner in which phenol-aldehyde resins and aminoplasts are cured. Another advantage of the present invention resides in the fact that it is possible to achieve a degree of heat resistance and chemical and solvent resistance which far surpasses the maximum that can be procured via the "in situ" cross linking that occurs in the processes of the prior art.

A polystyrene either as such or in the various modified forms taught by the prior art is not convertible to the infusible and insoluble state by reaction with any "curing agents" whatsoever. We have discovered that if, to the polystyrene, there be added a functionally reactive atomic group of the type previously set forth, such convertibility is possible. The present invention relates to those polystyrene-containing compounds which take the form of interpolymers of styrene and another substance, the functionally reactive atomic groups being structurally connected to the interpolymer via the other substance.

The interpolymerization may take place between styrene and substances which already contain appropriate functionally reactive atomic groups such as alcoholic hydroxyl groups, phenolic hydroxyl groups, amino groups, sulfhydryl groups, etc., said substances being capable, under the conditions of polymerization employed, of entering into reaction with the styrene so as to yield an interpolymer. Typical of such substances are vinyl phenol, vinyl thiophenol, amino styrene, methylamino styrene, or the corresponding derivatives of other copolymerizable vinyl compounds. The polymerization is generally carried out in the presence of a "polymerization catalyst" such as a peroxide or peroxide generating compound, e. g., benzoyl peroxide, acetyl peroxide, tertiary butyl hydro peroxide, lauryl peroxide, etc. The polymerization may be effected en masse, in solution or in the emulsified state.

An alternative method, somewhat more complicated in that it involves an additional manipulative step but nevertheless often preferred on economic grounds, is to copolymerize styrene with a compound containing a potentially functionally reactive atomic group such as vinyl acetate or meta-nitro-styrene and then convert the potentially reactive group to a reactive group by any appropriate treatment. Thus, when meta-nitro-styrene is employed, the nitro group may be "reduced" to an amino group or, when vinyl acetate is employed, the copolymer may be hydrolyzed, e. g., via the action of caustic soda, in order to replace some of the acetate radicals with hydroxy groups. In a similar manner one may utilize the more readily hydrolizable halogen containing compounds as interpolymerizing agents and then replace the halogen atoms with an —OH or —NH$_2$ group in conventional manner.

It has further been discovered that, in order for the resultant interpolymer to have the desired convertibility, the functionally reactive atomic groups must be present in sufficient quantity. More specifically, at least one such group must be present per 100 styrene groups (basal moles) in the chain. The preferred degree of modification corresponds to the introduction of between 5 and 25 of the afore-described functionally reactive atomic groups per 100 styrene groups in the chain. Put another way, on a weight basis, it has been found that in the instance of hydroxy or amino groups it is desirable that their concentration correspond to between 1 and 5% on the weight of the polymer.

The molecular weights of the interpolymers of the present invention, prior to cure, may range anywhere between about 25,000 and 1,000,000. The usual range is between about 40,000 and 200,000. Irrespective of what the original molecular weight be, in the process of curing or cross linking the molecular weight will be tremendously increased, depending upon how many molecules are linked together by the cross linking agent. In this connection it may be pointed out that the interpolymers of the present invention, like those of straight polystyrene, do not consist of a single entity possessed of a finite molecular weight, but rather comprise complex mixtures of polymers which may range from polymers possessed of a moderately low molecular weight to some with extremely high values. The molecular weights cited above refer to the mean or average molecular weight of the composition. The so-called molecular weight distribution curve will necessarily vary from polymer to polymer. It is emphasized that the interpolymerizations envisaged in the present invention do not bring into being polymers which, prior to cure, differ very materially in the matter of molecular weight, solubility, etc. from the prior art polystyrene or polystyrene interpolymers.

Various types of groups have heretofore been mentioned as functionally reactive atomic groups. Although all of these groups are serviceable for use in the present invention it must be realized that they are not the full equivalent of one another in the sense that (1) the facility with which it is possible to introduce the groups varies from group to group; (2) the economics involved vary from group to group; (3) the different groups endow the interpolymer containing them with physical and chemical attributes which differ to greater or lesser degree from one another; (4) the susceptibility to cure via the use of specifically selected curing or cross linking agents varies widely from group to group. Thus, the sulfhydryl group, while very satisfactory for the purposes of the present invention from the standpoint of imparting to the interpolymers the requisite susceptibility to cure, is objectionable in the sense that both the intermediate and the resultant endproducts have associated with them a highly objectionable odor which it is extremely difficult to eliminate. Amino groups and substituted amino groups are by far the most desirable from the standpoint of speedy and thorough susceptibility to cure via a host of curing or cross linking agents. In the pursuit of the present invention it has been found that hydroxy groups are, compared to amino groups, slow and sluggish in the susceptibility to cure that they impart to the resin. In many instances, however, they possess the advantage of being more economical to incorporate into the polymeric structure.

The following specific examples are illustrative of the products and processes of the present invention.

Example I 100 moles of styrene and 20 moles of meta-vinyl-phenol (meta-hydroxy-styrene) were interpolymerized with the aid of heat in the presence of 1% of benzoyl peroxide as catalyst. Attention is called to the fact that the interpolymerization was carried out in a perfectly conventional manner just as though the coreactant (meta-vinyl-phenol) were not present. The resultant interpolymer was (1) possessed of a light amber color; (2) grindably hard; (3) possessed of a softening point slightly above that of a straight polystyrene; (4) possessed of solubility characteristics comparable to those of a straight polystyrene; (5) fusible and (6) possessed of a pronounced styrene odor which could be eliminated by processing the polymer on hot open rolls. When the interpolymer was heated with an appropriate curing or cross linking agent (e. g., 10% of chlorinated furfural, preferably in the presence of a small quantity of red iron oxide or freshly prepared ferric hydroxide or zinc hydroxide) it became converted to the infusible and insoluble state, with a heat resistance very substantially greater than that of a straight polystyrene.

Example II 100 moles of styrene and 5 moles of meta-amino-styrene were interpolymerized with the aid of heat in the presence of 1% of benzoyl peroxide as catalyst. Attention is called to the fact that the interpolymerization was carried out in a perfectly conventional manner just as though the coreactant (meta-amino-styrene) were not present. The resultant interpolymer was (1) possessed of a light amber color; (2) grindably hard; (3) possessed of a softening point slightly above that of a straight polystyrene; (4) possessed of solubility characteristics comparable to those of a straight polystyrene; (5) fusible and (6) possessed of a pronounced styrene odor which could be eliminated by processing the interpolymer on hot open rolls. When the interpolymer was heated with an appropriate curing or cross linking agent (e. g., 10% of chlorinated furfural, preferably in the presence of a small quantity of red iron oxide or freshly prepared ferric hydroxide or zinc hydroxide) it became converted to the infusible and insoluble state, with a heat resistance very substantially greater than that of a straight polystyrene.

Styrene interpolymers modified so as to contain a substantial quantity of amino groups are probably the most reactive class of products of the present invention in that they are more readily susceptible to cure via a wide variety of curing or cross linking agents than any of the other modifications envisaged in the present invention. Materials that function in the capacity of curing or cross linking agents for the amino-group-containing interpolymers of the present invention are: (1) the saturated halogenation addition products of the aldehydes of the mono hetero atomic five membered rings; (2) the reactive derivatives of the aforementioned halogenated aldehydes; (3) di- and poly-carboxylic acids; (4) organic compounds containing a plurality of reactive chlorine or other halogen atoms, including materials such as chlorinated paraffin with a chlorine content in the neighborhood of 70%; and (5) poly aldehydes such as glyoxol.

Example III 100 moles of styrene and 50 moles of vinyl acetate were interpolymerized with the aid of heat in the presence of acetyl peroxide as catalyst. The resultant interpolymer was transparent and substantially water white and was possessed of a softening point intermediate between that of a medium molecular weight polyvinyl acetate and a straight polystyrene. As in the instance of the products of the first two examples, the styrene odor that it possessed could be eliminated by processing the interpolymer on hot rolls. The interpolymer was next finely crushed and added to a mixture comprising the ethyl ether of ethylene glycol and amyl alcohol. After stirring and heating to homogenize the mixture some water was added and an alcoholic sodium hydroxide solution was let slowly run in to effect the hydrolysis of a substantial percentage of the acetate groups. Under these conditions of reaction it was found that there was no great difficulty in effecting the replacement of one-quarter to one-half of the acetate groups contained in the interpolymer with alcoholic hydroxyl groups. A substantial quantity of water was then added to the mixture and the aqueous phase separated from the more or less emulsified phase containing the interpolymer (which is not appreciably soluble in water). The interpolymer was then isolated by evaporating off the volatiles from the polymer-containing phase. The resultant interpolymer was (1) possessed of a light straw color; (2) was more or less opaque though somewhat translucent; (3) soluble; (4) possessed of a softening point which, while not too well defined, appeared to be somewhat higher than that of a regular polystyrene. Upon heating with a material such as chlorinated furfural or a reactive derivative thereof (preferably in the presence of a small quantity of red iron oxide, zinc hydroxide or copper hydroxide), it was readily converted to the infusible and insoluble state.

Example IV 100 moles of styrene and 25 moles of meta-nitro-styrene were interpolymerized with the aid of heat in the presence of 1% tertiary butyl hydro peroxide as catalyst. The resultant light amber-yellow colored interpolymer was grindably hard and possessed of a softening point somewhat above that of regular polystyrene. The interpolymer was dissolved in benzene (other solvents such as styrene, toluene, phenol, etc. may be advantageously utilized) and emulsified with water with the aid of a standard emulsifying agent. The suspension was then subjected to reduction via the use of zinc dust and hydrochloric acid. The speed with which the nitro groups are reduced to amino groups is exceedingly slow as compared to the reduction of the nitro groups in the meta-nitro-styrene per se. It was not feasible to reduce more than about half of the nitro groups introduced but for the purposes of the present invention such a reduction was found more than adequate. The resultant partially reduced interpolymer was isolated in the orthodox manner. The amino-group-containing interpolmer was (1) possessed of an amber color; (2) grindably hard; and (3) soluble in substantially the same solvents in which straight polystyrene is soluble. Upon heating with the curing or cross linking agents referred to in the instance of Example II, the interpolymer became converted to the insoluble and infusible state. Owing to the various processing steps involved, the difficulty with which the nitro groups are reduced and owing further to the poor color of the resultant interpolymer, this particular embodiment of the present invention must be regarded as less preferable from some points of view than the procedures outlined in Examples I, II, or III.

For the purposes of the present invention it is unnecessary that the styrene constitute the sole monomer that is interpolymerized in the presence of the specifically selected co-monomer which contains the alluded to functionally reactive or potentially functionally reactive atomic groups. It is a very common practice in the interpolymerization of styrene to replace a portion of the styrene with any one of a wide variety of interpolymerizable agents. Thus, in lieu of straight styrene one may substitute therefor a mixture comprising styrene and a material such as chlorostyrene, acrylic ester, methacrylic ester, vinyl acetate, polyallyl ester, acrylonitrile, butadiene, dicyclopentadiene, vinyl chloride, vinylidene chloride, methyl styrene, ethyl styrene, butadiene carbon monoxide, etc. The following example is illustrative of this embodiment of the present invention.

Example V 60 moles of styrene, 40 moles of methyl styrene and 20 moles of meta amino styrene were interpolymerized with the aid of heat in the presence of benzoyl peroxide as catalyst. The resultant straw colored interpolymer was soluble, fusible and grindably hard. It possessed a pronounced styrene odor which could be eliminated by processing the interpolymer on hot rolls. When heated in the presence of a curing or cross linking agent of the type mentioned in connection with Example II, the interpolymer became converted to the substantially infusible and insoluble state.

It will be observed that in the instance of the above cited examples all the ingredients that entered into the mixture undergoing interpolymerization took part in the reaction. The interpolymers of the present invention may be made by carrying out the reaction in the presence of diluents which do not take part in the reaction. For this purpose one may utilize any of the many variations that are commonly employed for the interpolymerization of styrene. The following example is illustrative.

Example VI 100 moles of styrene, 20 moles of meta-aminostyrene and 100 moles of toluene were interpolymerized with the aid of heat in the presence of benzoyl peroxide as catalyst. The effect of the presence of the diluent was to slow up the rate of reaction and to modify somewhat the mean molecular weight of the resultant interpolymerization product. After the completion of the reaction, the interpolymer was isolated by evaporating off the volatiles. The resultant straw colored interpolymer was very similar to the product of Example II. For some applications it is desirable to leave the interpolymer dissolved in the toluene. In lieu of the toluene used in the above example one may utilize any one of a wide variety of materials known to be solvents for polystyrene, such as benzene, ethylene dichloride, etc.

The products of the present invention can oftentimes advantageously be produced by operating in the emulsion state. In this connection it is emphasized that the technique of emulsion interpolymerization in no appreciable measure differs from that utilized in the instance of straight styrene or the customary styrene interpolymerizable mixtures other than that the system will contain an interpolymerizable entity which contains the desired functionally reactive atomic groups containing reactive hydrogen atoms or groups convertible over into such functionally reactive atomic groups. The following example is illustrative of this technique.

Example VII 100 moles of styrene and 20 moles of meta-aminostyrene and 1% of benzoyl peroxide as catalyst was dispersed in 2,000 moles of water with the aid of a standard dispersing agent. The dispersion was stirred in a kettle provided with baffles and heated to 180° F. for a period of a few hours, after which the temperature was raised to 190° F. and then to 200° F., at which temperature it was kept until the interpolymerization was substantially completed (between 5 and 15 hours). The resultant interpolymer was secured in the form of small hard beads which were readily isolated by filtering or centrifuging off the surrounding fluid material. By and large the physical and chemical attributes of the isolated interpolymer were quite similar to those of the product of Example II.

The products of the present invention are possessed of all of the desirable attributes inherent in styrene polymers and in interpolymers of styrene and other substances and in addition possess the very desirable characteristic of being convertible to the hard and infusible state through the employment of suitable curing agents. This not only renders them easier to cure than conventional polystyrene or polystyrene derivatives, but also renders them useful for many applications where conventional "in situ" cross linked polystyrene derivatives cannot be used. Moreover, the heat resistance and chemical and solvent resistance of the products of the present invention is in general superior to similar prior art substances.

The functionally reactive atomic groups which apparently give to the interpolymers their desirable characteristics are most conveniently incorporated into the polymeric structure by interpolymerizing the styrene either with a substance containing the functionally reactive atomic groups (either with or without the presence of additional reacting substances) or with a substance containing a potentially functionally reactive group. These steps are carried out in a manner similar to that employed in the polymerization of the styrene itself and hence the equipment necessary is readily at hand and the manipulative technique is well known.

As many apparently widely different embodiments of this invention may be made without departing from the spirit and scope thereof, it is to be understood that we do not limit ourselves to the specific embodiments thereof except as defined in the appended claims.

We claim:

1. An interpolymer consisting essentially of styrene and another substance from the group consisting of mono-vinyl phenols, mono-vinyl thiophenols, amino styrenes, mono-vinyl acetates hydrolized after interpolymerization to replace ester groups with hydroxyl groups, nitro-styrenes reduced after interpolymerization to replace nitro groups with amino groups, and mono-vinyl halides hydrolized after interpolymerization to replace halogen atoms with hydroxyl or amino groups, said hydroxyl, amino, or sulfhydryl groups, as the case may be, being present in said interpolymer to the extent of not less than one such group per 100 original styrene molecules, said interpolymer being soluble and fusible and being convertible to the insoluble and infusible state via the agency of cross-linking or curing agents.

2. An interpolymer consisting essentially of styrene and mono-vinyl-phenol, the hydroxyl group of said phenol being present in said interpolymer to the extent of not less than 1 such group per 100 original styrene molecules, said interpolymer being soluble and fusible and being convertible to the insoluble and infusible state via the agency of cross-linking or curing agents.

3. An interpolymer consisting essentially of styrene and amino-styrene, the amino group of said amino-styrene being present in said interpolymer to the extent of not less than 1 such group per 100 original styrene molecules, said interpolymer being soluble and fusible and being convertible to the insoluble and infusible state via the agency of cross-linking or curing agents.

4. An interpolymer consisting essentially of styrene and mono-vinyl acetate hydrolized after interpolymerization to replace ester groups with hydroxyl groups, said hydroxyl groups being present in said interpolymer to the extent of not less than 1 such group per 100 original styrene molecules, said interpolymer being soluble and fusible and being convertible to the insoluble and infusible state via the agency of cross-linking or curing agents.

5. An interpolymer consisting essentially of styrene and nitro-styrene reduced after interpolymerization to replace nitro groups with amino groups, said amino groups being present in said interpolymer to the extent of not less than 1 such group per 100 original styrene molecules, said interpolymer being soluble and fusible and being convertible to the insoluble and infusible state via the agency of cross-linking or curing agents.

6. An interpolymer consisting essentially of styrene and mono-vinyl thiophenol, the sulfhydryl group being present in said interpolymer to the extent of not less than 1 such group per 100 original styrene molecules, said interpolymer being soluble and fusible and being convertible to the insoluble and infusible state via the agency of cross-linking or curing agents.

EMIL. E. NOVOTNY.
GEORGE KARL VOGELSANG.

REFERENCES CITED

The following references are of record in the file of this patent:

UNITED STATES PATENTS

| Number | Name | Date |
| --- | --- | --- |
| 2,118,863 | Reppe et al. | May 31, 1938 |
| 2,366,008 | D'Alelio | Dec. 26, 1944 |
| 2,404,220 | D'Alelio | July 16, 1946 |

FOREIGN PATENTS

| Number | Country | Date |
| --- | --- | --- |
| 467,402 | Great Britain | June 11, 1937 |
| 475,132 | Great Britain | Nov. 15, 1937 |